US011002238B2

(12) United States Patent
Youssef et al.

(10) Patent No.: US 11,002,238 B2
(45) Date of Patent: May 11, 2021

(54) METHOD AND SYSTEM FOR STARTING AN ENGINE

(71) Applicant: PRATT & WHITNEY CANADA CORP., Longueuil (CA)

(72) Inventors: Michael Youssef, Mississauga (CA); Alexandre Charest, Montreal (CA); Giancarlo Zingaro, Pointe-Claire (CA); Jasraj Chahal, Lasalle (CA); Carmine Lisio, Laval (CA); Darragh McGrath, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 42 days.

(21) Appl. No.: 16/274,384

(22) Filed: Feb. 13, 2019

(65) Prior Publication Data
US 2020/0256304 A1 Aug. 13, 2020

(51) Int. Cl.
*F02N 11/08* (2006.01)

(52) U.S. Cl.
CPC .... *F02N 11/087* (2013.01); *F02N 2011/0874* (2013.01)

(58) Field of Classification Search
CPC ................. F02N 11/087; F02N 2011/0874
USPC ...................................................... 123/179.3
See application file for complete search history.

(56) References Cited

U.S. PATENT DOCUMENTS

| | | | | | |
|---|---|---|---|---|---|
| 4,490,620 A | * | 12/1984 | Hansen | ............... | F02N 11/0848 123/179.3 |
| 4,563,987 A | * | 1/1986 | Geary | ................. | F02N 11/0811 123/179.3 |
| 4,611,290 A | * | 9/1986 | Henningsen | ....... | G05D 16/2066 169/13 |
| 5,233,964 A | * | 8/1993 | Jamoua | ................. | F02D 41/266 123/479 |
| 6,945,034 B2 | * | 9/2005 | Ueno | .................... | F01N 3/0814 60/288 |
| 8,044,531 B2 | * | 10/2011 | Kobayashi | ............ | F02N 11/087 307/10.6 |
| 8,620,559 B2 | * | 12/2013 | Jehle | ..................... | F02D 41/266 701/102 |
| 8,770,165 B2 | * | 7/2014 | Mizuno | ............... | F02N 11/0825 123/179.4 |
| 8,905,004 B2 | * | 12/2014 | Kitamura | .............. | F02D 41/062 123/479 |
| 8,925,498 B2 | * | 1/2015 | Tan | ..................... | F02D 19/0621 123/3 |
| 10,145,340 B1 | * | 12/2018 | Dudar | ...................... | F01N 9/00 |

(Continued)

*Primary Examiner* — David Hamaoui
*Assistant Examiner* — John D Bailey
(74) *Attorney, Agent, or Firm* — Norton Rose Fulbright Canada LLP

(57) ABSTRACT

Methods and systems for starting an aircraft propulsion engine are described herein. Operation of the engine is controlled by an engine controller having a first channel and a second channel. An engine start request is received on the second channel while the first channel is inactive. It is determined which one of the first channel and the second channel was used to conduct a last successful engine start. Responsive to determining that the last successful engine start was conducted on the second channel, a predetermined time period is waited to elapse and for the first channel to reinitialize before commanding, via the first channel, an engine start based on the engine start request.

18 Claims, 7 Drawing Sheets

(56) References Cited

U.S. PATENT DOCUMENTS

| | | | |
|---|---|---|---|
| 2003/0116132 A1* | 6/2003 | Koseki | F02N 11/08 123/406.54 |
| 2005/0139181 A1* | 6/2005 | Denz | F02N 11/103 123/179.3 |
| 2009/0030587 A1* | 1/2009 | Yonezawa | F02D 41/28 701/103 |
| 2009/0287393 A1* | 11/2009 | Moller | F02D 41/266 701/103 |
| 2010/0049418 A1* | 2/2010 | Jehle | F02D 41/266 701/102 |
| 2010/0250036 A1* | 9/2010 | Bamba | F02D 25/00 701/21 |
| 2011/0239992 A1* | 10/2011 | Metzdorf | F02D 29/02 123/488 |
| 2012/0330535 A1* | 12/2012 | Tsuji | G05D 16/2066 |
| 2014/0130762 A1* | 5/2014 | Fonseca | F02N 9/04 123/179.3 |
| 2017/0233103 A1* | 8/2017 | Teicholz | B64D 27/16 701/100 |
| 2017/0234236 A1* | 8/2017 | Feulner | F01D 19/02 60/778 |
| 2017/0234238 A1* | 8/2017 | Schwarz | F01D 25/34 60/778 |
| 2017/0363012 A1* | 12/2017 | Clauson | F01D 21/14 |
| 2018/0201386 A1* | 7/2018 | Strauss | B64D 45/00 |
| 2018/0245561 A1* | 8/2018 | Perez | F02N 11/0848 |
| 2018/0355764 A1* | 12/2018 | Clauson | F01D 21/00 |
| 2019/0145369 A1* | 5/2019 | Books | F02N 11/0818 123/179.4 |
| 2019/0234368 A1* | 8/2019 | MacArthur | F02N 11/10 |

* cited by examiner

METHOD AND SYSTEM FOR STARTING AN ENGINE

TECHNICAL FIELD

The present disclosure relates generally to engines, and more particularly to starting engines.

BACKGROUND OF THE ART

An electronic engine controller having two channels may be used for starting an aircraft engine. At the time of starting the engine, if one of the channels is not powered, the other channel may be used to start the engine. Still, if the same channel is consistently used to start the engine, there could be defects with the other channel or with the components connected to the other channel.

As such, there is need for improvement.

SUMMARY

In one aspect, there is provided a method for starting an aircraft propulsion engine. Operation of the engine is controlled by an engine controller having a first channel and a second channel. The method comprises receiving an engine start request on the second channel while the first channel is inactive, determining which one of the first channel and the second channel was used to conduct a last successful engine start, and responsive to determining that the last successful engine start was conducted on the second channel, waiting a predetermined time period to elapse and for the first channel to reinitialize before commanding, via the first channel, an engine start based on the engine start request.

In another aspect, there is provided an electronic engine controller for starting an aircraft propulsion engine. The controller having a first channel and a second channel. The controller comprising at least one processing unit, and at least one non-transitory computer-readable memory having stored thereon program instructions. The program instructions are executable by the at least one processing unit for receiving an engine start request on the second channel while the first channel is inactive, determining which one of the first channel and the second channel was used to conduct a last successful engine start, and responsive to determining that the last successful engine start was conducted on the second channel, waiting a predetermined time period to elapse and for the first channel to reinitialize before co anding, via the first channel, an engine start based on the engine start request.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
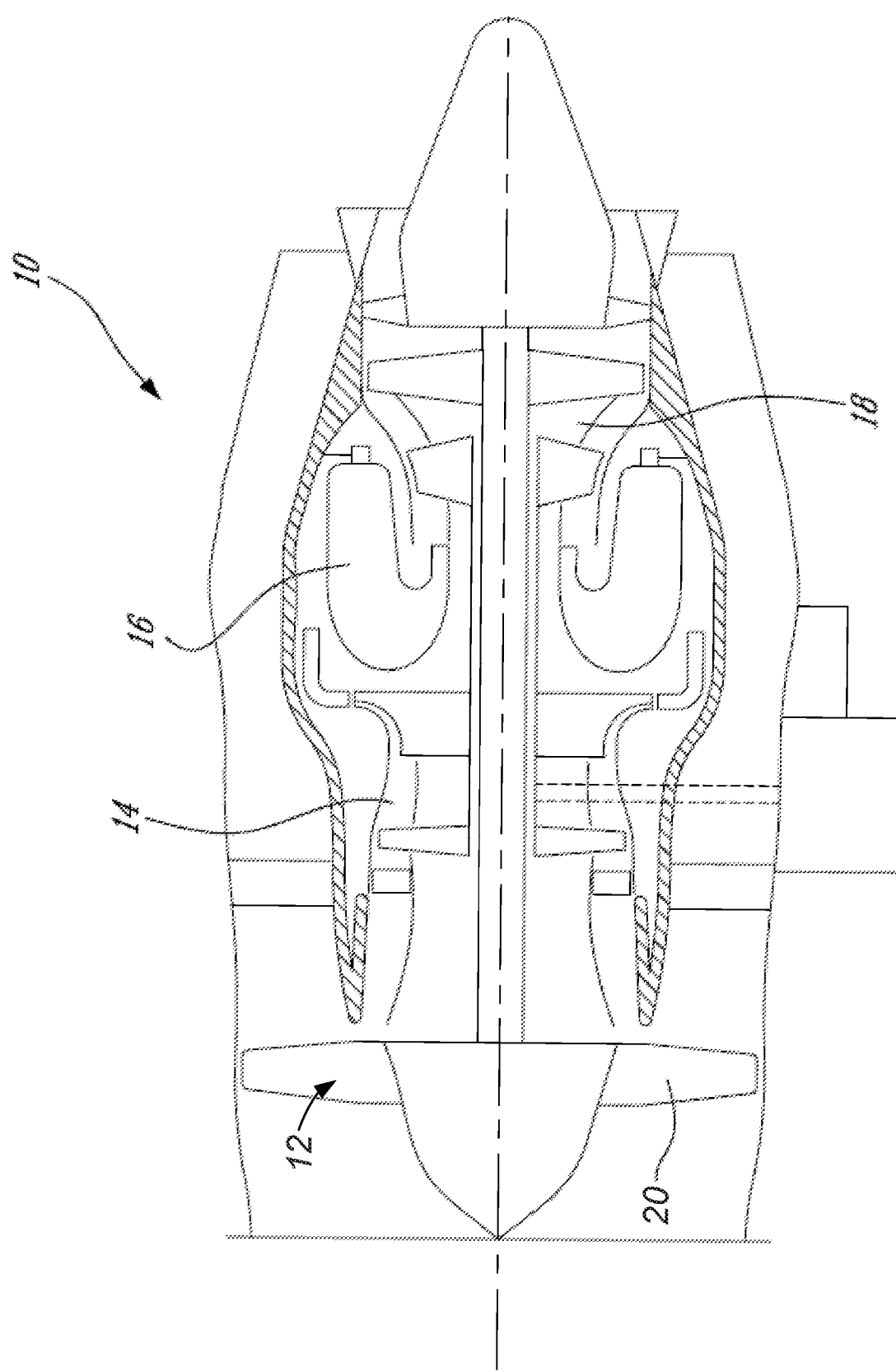
FIG. 1 is a schematic of an example gas turbine engine, in accordance with an illustrative embodiment.

FIG. 1 illustrates a gas turbine engine 10 that may be started using the methods and systems described herein. Engine 10 generally comprises in serial flow communication: a fan rotor 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan rotor 12 comprises a plurality of fan blades 20. It should be understood that while the engine 10 is a turbofan engine, the methods and systems described herein may be applicable to any other type of gas turbine engine, such as a turboprop, turboshaft or any other suitable aircraft engine. It should also be understood that the engine 10 can be any suitable aircraft propulsion system and that any combustion engine can therefore apply.

Figure 2A:
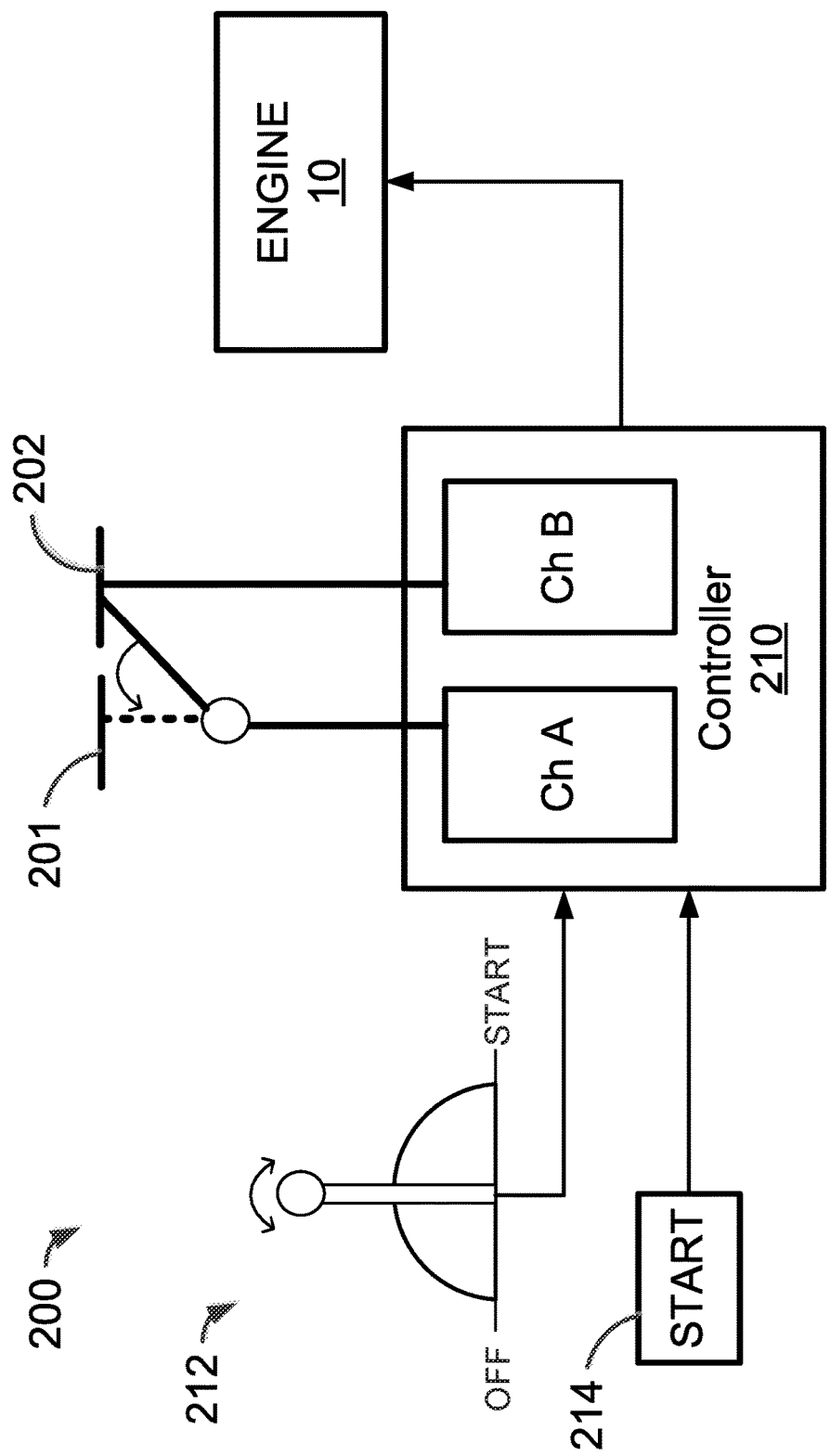
FIG. 2A is a schematic diagram illustrating a system for starting an engine, in accordance with an illustrative embodiment.

With reference to FIG. 2A, there is illustrated a system 200 for starting an engine, such as engine 10, in accordance with an embodiment. As illustrated, an electronic engine controller 210 may be used to control the engine 10. The controller 210 has two channels: channel A and channel B. The channels A, B are redundant channels and one of the channels (e.g., channel A) is selected as being active, while the other channel remains in standby (e.g., channel B). An active channel is configured to control the engine 10 whereas a channel in standby does not control the engine 10 but is ready to assume control when needed. If there is no power to a channel, the channel is inactive and non-functional. While the controller 210 is illustrated as separate from the engine 10, it should be understood that this is for illustrative purposes only and that the controller 210 may, in some embodiments, be integrated with the engine 10.

Each of the channels A, B may receive electrical power from the aircraft that the engine 10 is part of. In the illustrated embodiment, each channel A, B is powered by a secondary power bus 202 when the aircraft is on the ground and the engine 10 is not started. However, prior to starting of the engine 10, it is desirable for the channels A, B to not be connected to the same aircraft power bus. Channel A may therefore switch from the secondary power bus 202 to a primary power bus 201 of the aircraft when a pilot moves a start panel rotary switch 212 from an OFF position to a START position, causing a power interruption to channel A. When channel A is the active channel and the power interruption to channel A occurs, resulting in channel A becoming non-functional, the controller 210 switches over to channel B as the active channel. Conversely, when the pilot moves the start panel rotary switch 212 from the OFF position to the START position, channel B remains connected to the secondary power bus 202 and is not susceptible to a power interruption having a time duration that would cause a switch over of the active channel. As used herein, a channel switch over refers to switching from one channel (e.g., channel A) as the active channel to the other channel (e.g., channel B) as the active channel. A channel switch over may occur for other reasons than a power interruption and the above example is illustrative of only one case of when a channel switch over may occur. For example, a channel switch over may occur in response to detecting a fault. By way of another example, a channel switch over may occur due to regular scheduling to exercise functionality of both channels A, B on a rotation.

Once the start panel rotary switch 212 is in the START position, the pilot may actuate an engine start actuator 214 (e.g., push a discrete push button) in the cockpit to command start of the engine 10. When the engine start actuator 214 is actuated, an engine start request is sent to the controller 210. When channel A is inactive (e.g., non-functional due to a power interruption), the engine start request is received by channel B. The controller 210 determines which one of the channels was used to conduct a last successful engine start. The controller 210, responsive to determining that the last successful engine start was conducted on channel B, waits a predetermined time period to elapse and for channel A to reinitialize before commanding, via channel A, an engine start based on the engine start request. The time period may correspond to at least the time it would take for channel A to reset (e.g., to reinitialize and become functional in response to a power interruption). For example, the predetermined time period may be 3 seconds, 4 seconds, 5 seconds or any other suitable period of time. The controller 210 detects when channel A becomes functional and switches to channel A when the channel A becomes functional within the predetermined time period.

In some embodiments, the controller 210, responsive to determining that the last successful engine start was conducted on channel A, commands, via channel B, the engine start based on the engine start request. The starting of the engine 10 with channel B, when channel A last successfully started the engine, may be done without any delay (e.g., the above-mentioned predetermined time period). It should be appreciated that the above described functioning of the controller 210 may allow for the controller 210 to rotate between channel A and channel B for starting the engine 10. In some embodiments, the controller 210, responsive to determining that the last successful engine start was conducted on channel B, waits for the predetermined time period to elapse, detects that channel A is non-functional, and commands, via channel B, the engine start based on the engine start request.

Figure 2B:
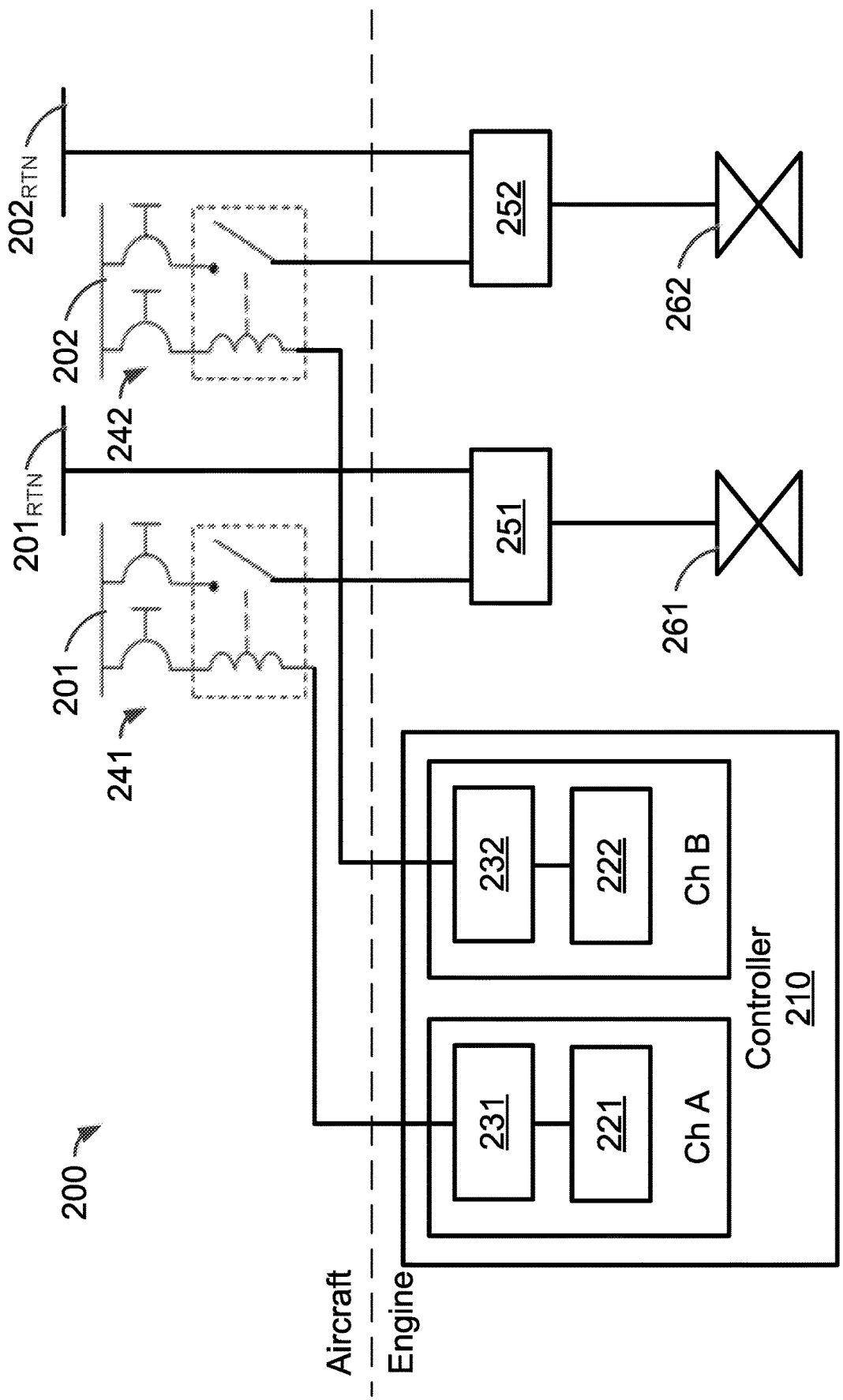
FIG. 2B is a schematic diagram illustrating the system of FIG. 2A, where ignition exciters are used for starting the engine, in accordance with an illustrative embodiment.

With reference to FIG. 2B, the system 200 is illustrated where ignitors 261, 262 are used to start the engine 10. As illustrated, channel A has a first computing device 221 and a first electronic switch 231 and channel B has a second computing device 222 and a second electronic switch 232. The electronic switches 231, 232 may be implemented using low side switches (LSS). When channel A is the active channel and used to start the engine, the first computing device 221 can command the first electronic switch 231 to be closed. The first electronic switch 231 when closed causes a first relay 241 of the aircraft to provide power from the primary power bus 201 to a first ignition exciter 251 which starts the engine 10 with a first ignitor 261. The first ignition exciter 251 is shown connected to a primary power bus return $201_{RTN}$ for power return. Similarly, when channel B is the active channel and used to start the engine, the second computing device 222 can command the second electronic switch 232 to be closed. The second electronic switch 232 when closed causes a second relay 242 of the aircraft to provide power from the secondary power bus 202 to a second ignition exciter 252 which starts the engine 10 with a second ignitor 262. The second ignition exciter 252 is shown connected to a second power bus return $201_{RTN}$ for power return.

Figure 2C:
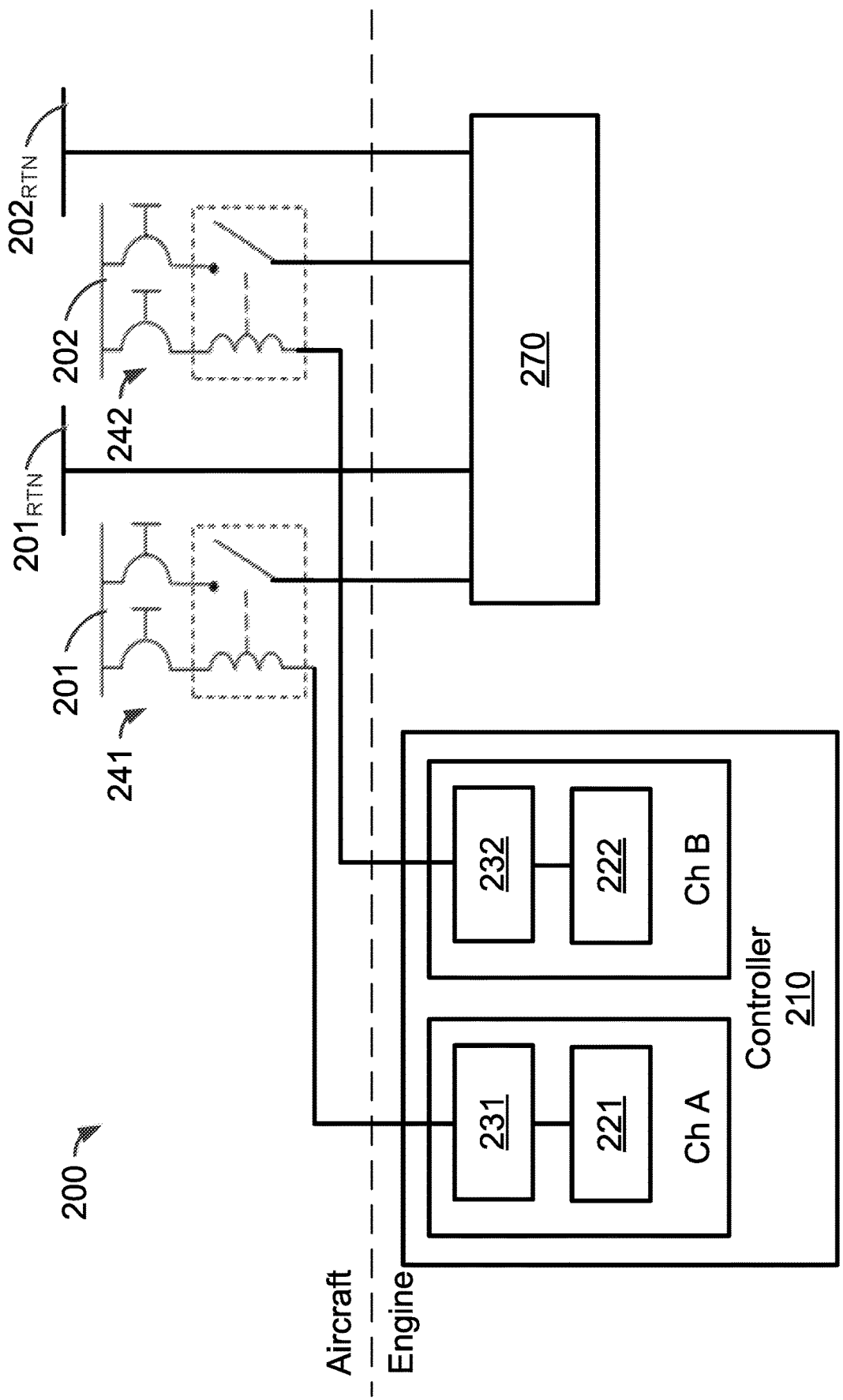
FIG. 2C is a schematic diagram illustrating the system of FIG. 2A, where a starter is used for starting the engine, in accordance with an illustrative embodiment.

With reference to FIG. 2C, the system 200 is illustrated where a starter 270 is used to start the engine 10. The system shown in FIG. 2C is similar to the system shown in FIG. 2C and like features are not described herein. In this embodiment, the first electronic switch 231 when closed causes the first relay 241 to provide power from the primary power bus 201 to a starter 270 which starts the engine 10. Similarly, in this embodiment, the second electronic switch 232 when closed causes the second relay 242 to provide power from the primary power bus 201 to the starter 270 which starts the engine 10. Fuel flow to the engine 10 for starting the engine is controlled as known to those skilled in the art.

Figure 3A:
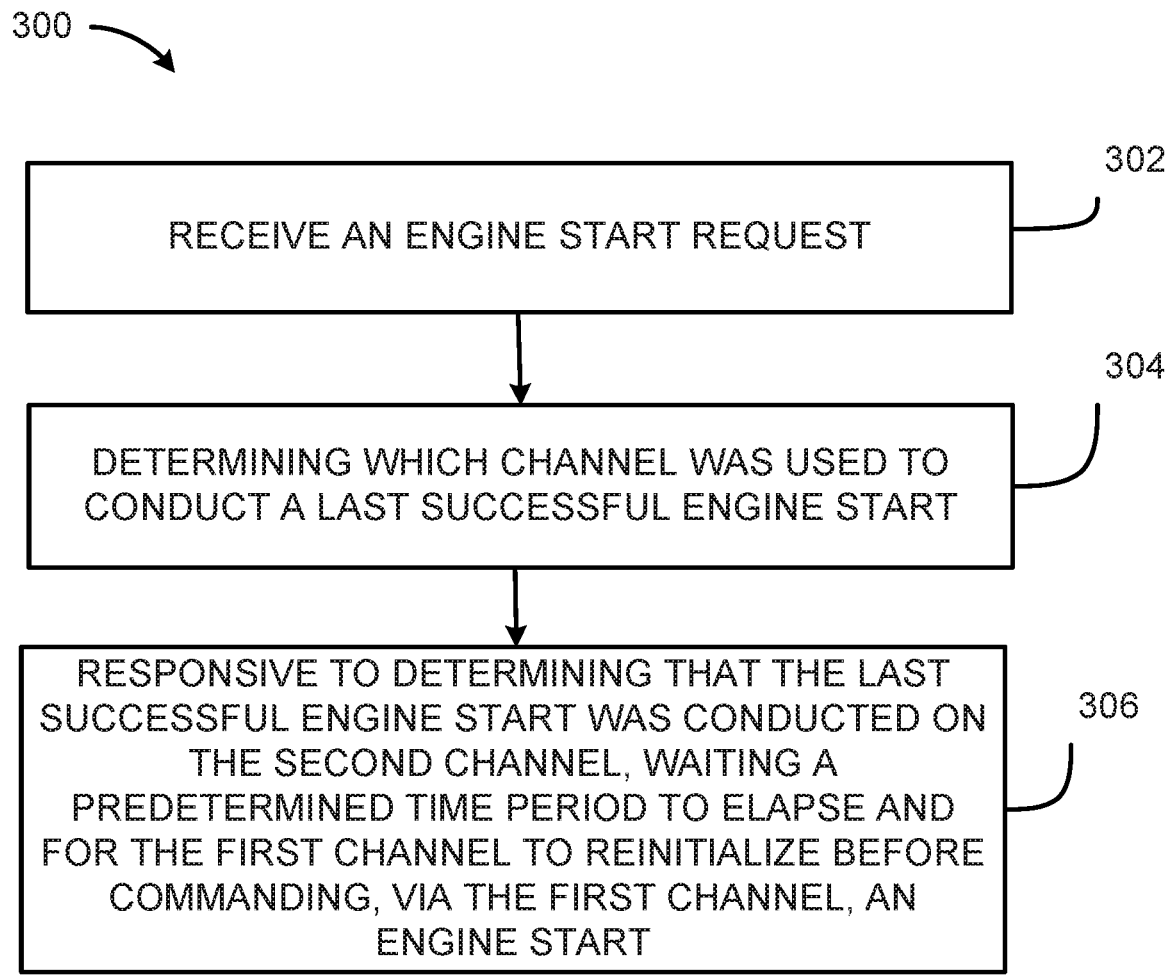
FIG. 3A is a flowchart of a method for starting an engine, in accordance with one illustrative embodiment.

With reference to FIG. 3A, there is illustrated a flowchart of a method 300 for starting an engine, such as the engine 10, in accordance with an embodiment. The operation of the engine 10 is controlled by an engine controller, such as the controller 210, having first and second channels. At step 302, an engine start request is received at the second channel (e.g., channel B) of the controller 210 while the first channel (e.g., channel A) is inactive (e.g., non-functional due to a power interruption of the first channel). The engine start request may be received from the engine start actuator 214. The engine start request may be received from one or more sensors for detecting actuation of the engine start actuator 214. The engine start request may be received from an aircraft and/or engine computer. At step 304, prior to starting the engine 10 based on the engine start request, it is determined which one of the first channel and the second channel was used to conduct a last successful engine start. Determining which one of the first channel and the second channel last successfully started the engine 10 may comprise obtaining from the memory of the controller 210 data indicative of which one of the first channel and the second channel last successfully started the engine 10. At step 306, responsive to determining that the last successful engine start was conducted on the second channel, the method 300 comprises waiting for a predetermined time period to elapse and for the first channel to reinitialize before commanding, via the first channel, an engine start based on the engine start request. In some embodiments, waiting for the first channel to reinitialize comprises detecting that the first channel is functional and switching to the first channel when the first channel becomes functional within the predetermined time period. In some embodiments, the waiting for the channel switch over to the first channel is to wait for the first channel to reboot once power is restored to the first channel following a power interruption of the first channel.

Figure 3B:
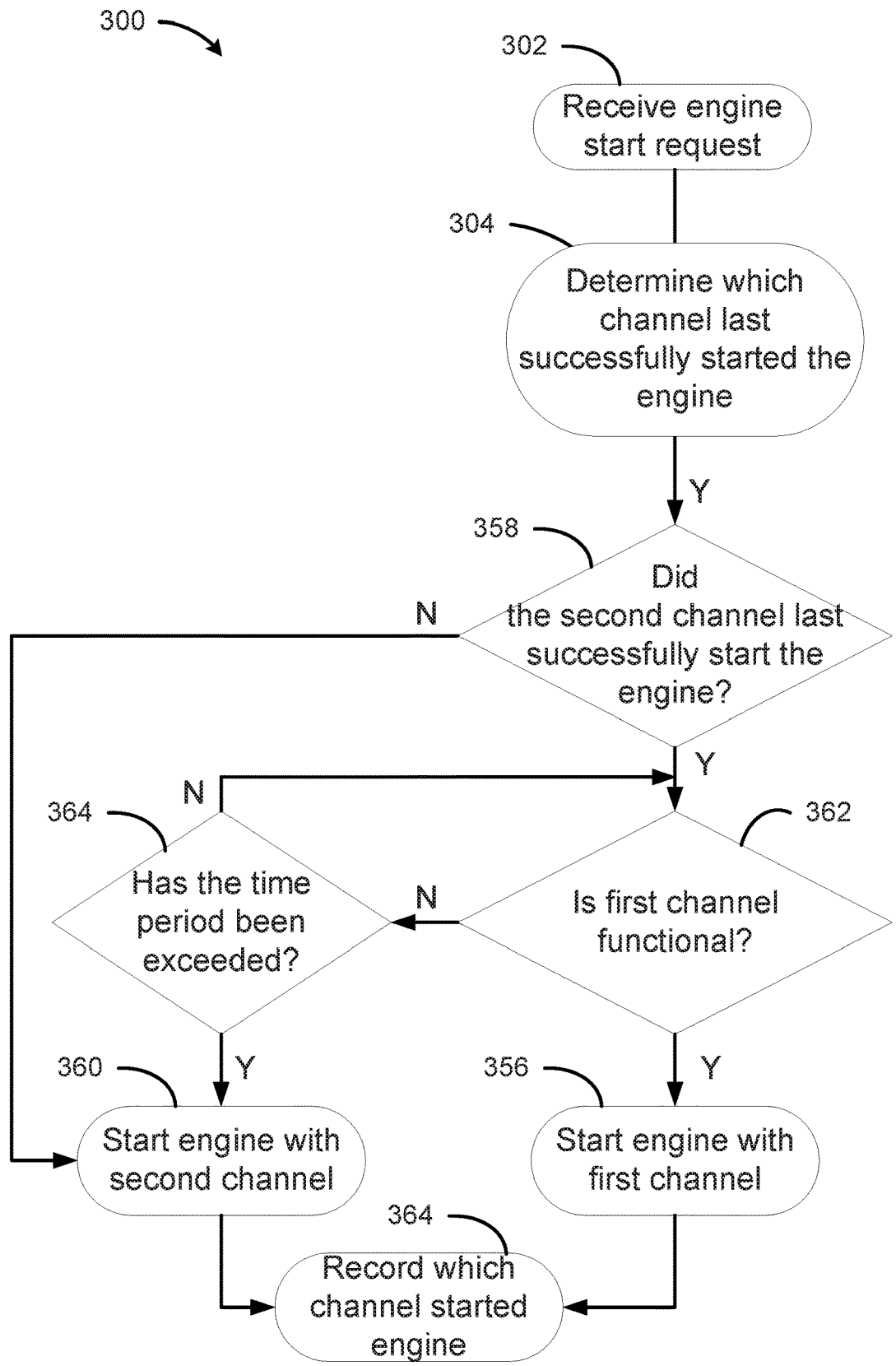
FIG. 3B is a flowchart of a method for starting the engine, in accordance with another illustrative embodiment.

With additional reference to FIG. 3B, there is illustrated another embodiment of the method 300. At step 302, an engine start request is received. At step 304, prior to starting the engine 10 based on the engine start request, it is determined which channel last successfully started the engine 10. At step 358, an assessment is made to determine if the second channel last successfully started the engine 10. If the second channel last started the engine 10, the method proceeds from step 358 to step 362.

In some embodiments, the method 300 comprises starting the engine with the second channel when the first channel last successfully started the engine 10. If it is determined at step 358 that the second channel was not used to perform the last successful start of the engine 10 (i.e., if the first channel last successfully started the engine 10), then the second channel is used to start the engine 10 at step 360. In other words, responsive to determining that the last successful engine start was conducted on the first channel, the method 300 may comprise commanding, via the second channel, the engine start based on the engine start request. This commanding of the engine start may be made without waiting for the predetermined time period to elapse.

In some embodiments, the method 300 comprises starting the engine 10 with the second channel when the first channel fails to become functional within the predetermined time period. At step 362, it is determined whether the first channel is functional. If the first channel is not functional, then at step 364 it is determined whether the predetermined time period has been exceeded. If the time period has not been exceeded, then the method 300 returns to step 362. If the time period has been exceeded, then the engine 10 is started with the second channel at step 360. In other words, responsive to determining that the last successful engine start was conducted on the second channel, the method 300 may comprises waiting for the predetermined time period to elapse, detecting that the first channel is non-functional, and commanding, via the second channel, the engine start based on the engine start request.

At step 362, if it is determined that the first channel is functional, then the engine 10 is started with the first channel at step 356.

In some embodiments, at step 364, the channel that successfully started the engine 10 is recorded in the memory of the controller 210 after starting the engine 10.

In some embodiments, one of the ignitors 261, 262 is used to start the engine 10; however, if after a predetermined time period (e.g., 5 seconds, 10 seconds, 15 seconds, etc.) light-off of the engine 10 has not been detected, then both of the ignitors 261, 262 may be used to attempt to start the engine 10.

The methods and system for starting the engine 10 as described herein may be used for ground starts of the engine 10. In some embodiments, which one of the first channel and second channel was used to conduct the last successful engine start is determined at step 304 in response to detecting that the aircraft is on-ground.

The methods and system for starting the engine 10 as described herein may be used when the controller 210 is operating with a single channel. For example, if the controller 210 is operating with channel A (and channel B is non-operable), in response to receiving an engine start request, the controller 210 attempts to start the engine 10 with channel A. If channel A experiences power interruptions, the controller 210 continuously attempts to start the engine 10 following a reboot of channel A until a successful engine start or start request has been aborted. Similarly, for example, if the controller 210 is operating with channel B (and channel A is non-operable), in response to receive an engine start request, the controller 210 will start the engine 10 with channel B, which may be done without any predetermined delay.

In some embodiments, of the method 300, commanding, via the first channel, the engine start comprises commanding the first electronic switch 231 of the first channel to close, the first electronic switch 231 when closed causes the first relay 241 to provide power to the first ignition exciter 251 or the starter 270 for starting the engine. In some embodiments, of the method 300, commanding, via the second channel, the engine start comprises commanding the second electronic switch 232 of the second channel to close, the second electronic switch 232 when closed causes the second relay 242 to provide power to the second ignition exciter 252 or the starter 270 for starting the engine.

Figure 4:
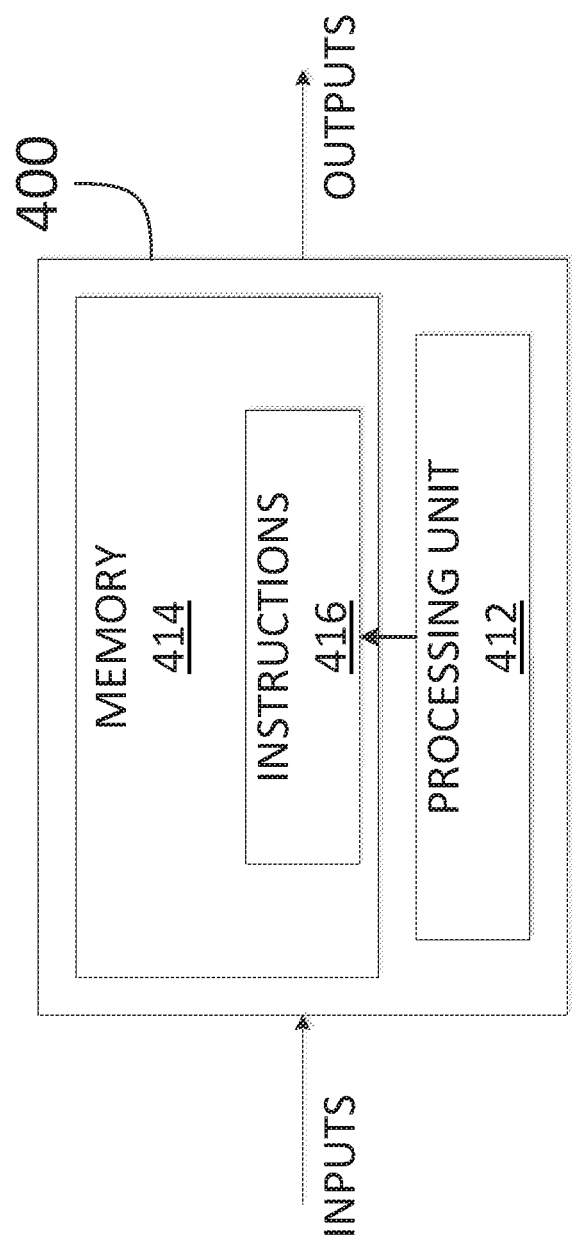
FIG. 4 is a block diagram of an example computing device for implementing the systems and methods described herein, in accordance with an illustrative embodiment.

With reference to FIG. 4, an example of the computing device 400 is illustrated. The controller 210 may be implemented using one or more computing devices 400. For example, each of the first computing device 221 and the second computing device 222 of FIG. 2B and FIG. 2C may be implemented with a respective computing device 400. The computing device 400 comprises a processing unit 412 and a memory 414 which has stored therein computer-executable instructions 416. The processing unit 412 may comprise any suitable devices configured to implement the method 300 such that instructions 416, when executed by the computing device 400 or other programmable apparatus, may cause the functions/acts/steps performed as part of the method 300 as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412. Note that the computing device 400 can be implemented as part of a full-authority digital engine control (FADEC) or other similar device, including electronic engine control (EEC), engine control unit (ECU), and the like.

The methods and systems for starting an engine described herein may be implemented in a high level procedural or object oriented programming or scripting language, or a combination thereof, to communicate with or assist in the operation of a computer system, for example the computing device 400. Alternatively, the methods and systems for starting an engine may be implemented in assembly or machine language. The language may be a compiled or interpreted language. Program code for implementing the methods and systems for starting an engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for starting an engine may also be considered to be implemented by way of a non-transitory computer-readable storage medium having a computer program stored thereon. The computer program may comprise computer-readable instructions which cause a computer, or more specifically the processing unit 412 of the computing device 400, to operate in a specific and predefined manner to perform the functions described herein, for example those described in the method 300.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for starting an engine may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for starting a propulsion engine of an aircraft, operation of the engine controlled by an engine controller having a first channel and a second channel, the method comprising:
receiving an engine start request on the second channel while the first channel is inactive;
determining, in response to detecting that the aircraft is on-ground, which one of the first channel and the second channel was used to conduct a last successful engine start; and
responsive to determining that the last successful engine start was conducted on the second channel, waiting a predetermined time period to elapse and for the first channel to reinitialize before commanding, via the first channel, an engine start based on the engine start request.

2. The method of claim 1, further comprising, responsive to determining that the last successful engine start was conducted on the first channel, commanding, via the second channel, the engine start based on the engine start request.

3. The method of claim 2, wherein the engine start is commanded via the second channel without waiting for the predetermined time period to elapse.

4. The method of claim 1, further comprising, responsive to determining that the last successful engine start was conducted on the second channel, waiting for the predetermined time period to elapse, detecting that the first channel is non-functional, and commanding, via the second channel, the engine start based on the engine start request.

5. The method of claim 1, wherein waiting for the first channel to reinitialize comprises detecting that the first channel is functional and switching to the first channel when the first channel becomes functional within the predetermined time period.

6. The method of claim 1, wherein commanding, via the first channel, the engine start comprises commanding an electronic switch of the first channel to close, the electronic switch when closed causes a relay to provide power to one of an ignition exciter and a starter for starting the engine.

7. The method of claim 1, wherein commanding, via the second channel, the engine start comprises commanding an electronic switch of the second channel to close, the electronic switch when closed causes a relay to provide power to one of an ignition exciter and a starter for starting the engine.

8. The method of claim 1, wherein the predetermined time period corresponds to at least a time it would take for the first channel to reset.

9. The method of claim 1, wherein the engine start request is received while the first channel of the engine controller is non-functional due to a power interruption of the first channel.

10. A electronic engine controller for starting a aircraft propulsion engine of an aircraft, the controller having a first channel and a second channel, the controller comprising:
at least one processing unit; and
at least one non-transitory computer-readable memory having stored thereon program instructions executable by the at least one processing unit for:
receiving an engine start request on the second channel while the first channel is inactive;
determining in response to detecting that the aircraft is on-ground, which one of the first channel and the second channel was used to conduct a last successful engine start; and
responsive to determining that the last successful engine start was conducted on the second channel, waiting a predetermined time period to elapse and for the first channel to reinitialize before commanding, via the first channel, an engine start based on the engine start request.

11. The controller of claim 10, wherein the program instructions are further executable by the at least one processing unit for, responsive to determining that the last successful engine start was conducted on the first channel, commanding, via the second channel, the engine start based on the engine start request.

12. The controller of claim 11, wherein the program instructions are executable by the at least one processing unit for commanding the engine start via the second channel without waiting for the predetermined time period to elapse.

13. The controller of claim 10, wherein the program instructions are further executable by the at least one processing unit for, responsive to determining that the last successful engine start was conducted on the second channel, waiting for the predetermined time period to elapse, detecting that the first channel is non-functional, and commanding, via the second channel, the engine start based on the engine start request.

14. The controller of claim 10, wherein the program instructions are executable by the at least one processing unit for waiting for the first channel to reinitialize comprising detecting that the first channel is functional and switching to the first channel when the first channel becomes functional within the predetermined time period.

15. The controller of claim 10, wherein the program instructions are executable by the at least one processing unit for commanding, via the first channel, the engine start comprising commanding an electronic switch of the first channel to close, the electronic switch when closed causing a relay to provide power to one of an ignition exciter and a starter for starting the engine.

16. The controller of claim 10, wherein the program instructions are executable by the at least one processing unit for commanding, via the second channel, the engine start comprising commanding an electronic switch of the second channel to close, the electronic switch when closed causing a relay to provide power to one of an ignition exciter and a starter for starting the engine.

17. The controller of claim 10, wherein the predetermined time period corresponds to at least a e it would take for the first channel to reset.

18. The controller of claim 10, wherein the program instructions are executable by the at least one processing unit for receiving the engine start request while the first channel of the engine controller is non-functional due to a power interruption of the first channel.

\* \* \* \* \*